United States Patent
Isozaki

[19]
[11] Patent Number: 6,141,110
[45] Date of Patent: Oct. 31, 2000

[54] IMAGE FORMING APPARATUS AND METHOD FOR CONTROLLING MULTI-PHASE STEPPING MOTOR FOR USE IN IMAGE FORMING APPARATUS

[75] Inventor: Atsushi Isozaki, Ichinomiya, Japan

[73] Assignee: Brother Kogyo Kabushiki Kaisha, Nagoya, Japan

[21] Appl. No.: 09/075,330

[22] Filed: May 11, 1998

[30] Foreign Application Priority Data

May 19, 1997 [JP] Japan ...................................... 9-128912

[51] Int. Cl.⁷ ................. H04N 1/21; H02P 8/00
[52] U.S. Cl. .......... 358/1.12; 358/296; 358/412; 318/696
[58] Field of Search ...................... 358/498, 412, 358/413, 418, 486, 401, 296, 1.12, 1.1, 1.15, 1.5, 1.18, 1.8; 395/111, 105, 117, 108, 101; 318/696, 685; 347/16, 104, 215; 271/164, 162

[56] References Cited

U.S. PATENT DOCUMENTS 4,707,649  11/1987  Kanemura .................................. 318/685

*Primary Examiner*—Cheukfan Lee
*Attorney, Agent, or Firm*—Oliff & Berridge, PLC

[57] ABSTRACT

In an image forming apparatus and method using a stepping motor for feeding a recording paper, the stepping motor is driven based on a single a line feed control pattern without switching control patterns. An excitation phase counter MPC indicative of a present exciting phase data is compared with a predetermined fixed exciting phase data. If both data coincides, a recording by a recording head is started at the same time the recording paper is advanced by the stepping motor. If both data differs from each other, the stepping motor is driven until both data coincides and thereafter the recording is started with a further driving of the stepping motor. Thus, the data recording on the recording paper is started at the same time as exciting the fixed exciting phases.

3 Claims, 4 Drawing Sheets

| EXCITING PHASE MPC | STATUS | EXCITING PHASE DATA (HIGHER BITS) | | | | (LOWER BITS) | | | | EXCITING PHASE |
|---|---|---|---|---|---|---|---|---|---|---|
| | | | | | | D | C | B | A | |
| 1 | 33H | 0 | 0 | 1 | 1 | 0 | 0 | 1 | 1 | AB |
| 2 | 66H | 0 | 1 | 1 | 0 | 0 | 1 | 1 | 0 | BC |
| 3 | CCH | 1 | 1 | 0 | 0 | 1 | 1 | 0 | 0 | CD |
| 4 | 99H | 1 | 0 | 0 | 1 | 1 | 0 | 0 | 1 | DA |

| LF INTERVAL | DENSITY PARAMETER 1 | ---------- | DENSITY PARAMETER n |
|---|---|---|---|
| LF1 (LONG) | PARA1-1 | | PARAn-1 |
| LF2 | PARA1-2 | | PARAn-2 |
| LF3 | PARA1-3 | | PARAn-3 |
| LF4 | PARA1-4 | ---------- | PARAn-4 |
| LF5 | PARA1-5 | | PARAn-5 |
| LF6 | PARA1-6 | | PARAn-6 |
| LF7 | PARA1-7 | | PARAn-7 |
| LF8 (SHORT) | PARA1-8 | | PARAn-8 |

IMAGE FORMING APPARATUS AND METHOD FOR CONTROLLING MULTI-PHASE STEPPING MOTOR FOR USE IN IMAGE FORMING APPARATUS

CROSS REFERENCE TO RELATED APPLICATION

This application relates to and incorporates herein by reference Japanese Patent Application No. 9-128912 filed on May 19, 1997.

BACKGROUND OF THE INVENTION

1. Field of the Invention

The present invention relates to an image forming apparatus for providing a uniform image and a method for controlling a multi-phase stepping motor for use in an image forming apparatus.

2. Description of Related Art

In a facsimile apparatus or the like, image data received from another facsimile apparatus of the other party through a communication channel is sequentially stored in a recording buffer provided within a RAM (random-access memory), and then outputted through a recording apparatus to a recording paper. When the received image data is recorded on the recording paper, line feed control patterns corresponding to the amount of received image data stored in the recording buffer are set in advance with respect to various parameters. Then, the line feed operation for the recording paper is controlled in accordance with the line feed control patterns.

The line feed control which uses the density of recording as one parameter, for example, is shown in FIG. 5. In this control, the line feed interval (LF interval) is divided into 8 different stages. The LF interval is a length by which the recording paper is advanced at every constant time in a line feed fashion. The LF interval is progressively shortened from LF1 to LF8. When the amount of received image data stored in the recording buffer is large, the LF interval is lengthened to speed up the recording speed. Conversely, when the amount of received image data is small, the LF interval is shortened to slow down the recording speed. Thus, the LF interval is switched in response to the amount of received image data stored in the recording buffer.

However, if the LF interval is switched successively, the density of an image (recording image density) recorded actually in a portion in which the LF interval is long is decreased while the recording image density of an image recorded actually in a portion in which the LF interval is short is increased, even when the density set by the amount of ink, toner or the like to be supplied is made constant to record the image on the recording paper with a predetermined density. As a result, the image cannot be recorded on the recording paper with a constant recording image density, resulting in irregular or non-uniform image density on the recording paper.

Therefore, to record an image on a recording paper with a predetermined recording density, the set density is changed in response to the change of the LF interval with respect to each density parameter, i.e., line feed control pattern is set in advance. That is, when the LF interval is long, the set density is increased. When on the other hand the LF interval is short, the set density is decreased. Thus, an image is recorded with respective density parameters, there can be provided respective constant recording image densities.

In order to advance the recording paper in a line feed fashion, a 4-phase stepping motor 10 of a 2-phase exciting system is used, for example.

As shown in FIG. 6, this stepping motor 10 comprises a stator comprising a first winding unit 11 having two exciting phases (A-phase and C-phase) and a second winding unit 12 having two exciting phases (B-phase and D-phase) and a rotor 13 having alternately-arranged two magnetic polarities (not shown). Magnetic poles for A-phase and C-phase are alternately disposed on the inner wall of the first winding unit 11 at an equal interval in the circumferential direction. Also, magnetic poles for B-phase and D-phase are alternately disposed on the inner wall of the second winding unit 12 at an equal interval in the circumferential direction.

The first winding unit 11 and the second winding unit 12 are assembled in such a manner that the magnetic pole for the A-phase and the magnetic pole for the C-phase of the first winding unit 11 are arrayed on the axial symmetries (dotted lines) of the magnetic pole for the B-phase and the magnetic pole for the D-phase of the second winding unit 12. As a result, the magnetic poles are arrayed on the inner periphery of the winding unit at an equal interval along the circumferential direction in the sequential order of A, B, C, D.

However, in actual practice, the magnetic poles A, B, C, D are likely to be not arrayed at an equal angular interval accurately due to a positioning error caused when the first winding unit 11 and the second winding unit 12 are assembled.

Thus, when the 2-phase exciting control is carried out, the rotation angle of the rotor 13 provided when the A-phase and B-phase are excited and the rotation angle of the rotor provided when the B-phase and the C-phase are excited differ from each other. This causes a problem that the feed amount of the recording paper advanced by the stepping motor 10 in a line feed fashion is not uniform. That is, even though a recording pattern with respect to the excitation from a specified exciting phase is set, when an excitation from other exciting phase is carried out, a similar recording pattern cannot be provided.

For example, when there is set a line feed control pattern which is set based on a relationship between an LF interval and a predetermined density parameter in response to the case in which the magnetic poles are excited from the A-B phases upon start of the recording, if the magnetic poles are excited from the B-C phases to start the recording, then the LF interval does not correspond to that provided in which the magnetic poles are excited from the B-C phases. Therefore, even when it is intended to record image data with the predetermined density parameter, a density of recorded image does not become uniform. Furthermore, because the feed amount of the recording paper is different, a recorded image also is changed.

As a result, it is disadvantageous that, when recording is performed on the recording paper based on the received image data, a resultant image becomes different due to a difference of exciting phases (recording start exciting phases) of the magnetic poles excited at the beginning of the recording operation.

In this case, in order to provide a uniform image on a recording paper, it is necessary to set the specific line feed control pattern for each recording start exciting phase with respect to a predetermined parameter so that the line feed control pattern is switched in correspondence with the recording start exciting phase from which the recording is started.

SUMMARY OF THE INVENTION

It is an object of the present invention to provide a method of controlling a stepping motor for use in an image forming without switching a line feed control pattern with respect to a predetermined parameter and an image forming apparatus which provides a uniform recording image.

According to the present invention, when a recording paper is advanced by a stepping motor, the stepping motor is stopped after the paper is advanced by a length corresponding to a predetermined top margin on the recording paper. Then, before the stepping motor is driven again for starting the recording of a received image data, the excitation phases to be excited at that time are checked. If it is confirmed that the excitation phases to be excited first corresponds to the predetermined excitation phases, then the stepping motor is driven normally by exciting the excitation phases to start the recording operation.

If the checked excitation phases to be excited first are not the predetermined excitation phases, then the excitation phases are excited forcedly again, so that the stepping motor is rotated by several steps until the excitation phases to be excited first become the predetermined excitation phases. Then, the normal recording is started at the same time the predetermined excitation phases are excited to drive the stepping motor.

According to this method, since the recording start excitation phases are determined or fixed in advance of the recording operation, the line feed control pattern may be set only in correspondence with the predetermined recording start excitation phases.

That is, even when circumferential distances between adjacent excitation phases differ due to an assembling error in a stepping motor, a relative position between the excitation phases is fixed after assembling. Hence, the excitation phases that are initially excited when the recording is started may be determined previously, and only the line feed control pattern for exciting the excitation phases may be determined. Accordingly, since a plurality of line feed control patterns are not required, memory for storing different line feed control patters can be reduced and a resulting recorded image becomes uniform in a recording image density.

Preferably, the presently excited phases are monitored and stored so that the forced excitation of the phases of the stepping motor is controlled in accordance with the stored excited phases.

BRIEF DESCRIPTION OF THE DRAWINGS

Other objects, features and advantages of the present invention will be made more apparent by the following detailed description with reference to the drawings. In the drawings.

DETAILED DESCRIPTION OF THE PREFERRED EMBODIMENT

Figure 1:
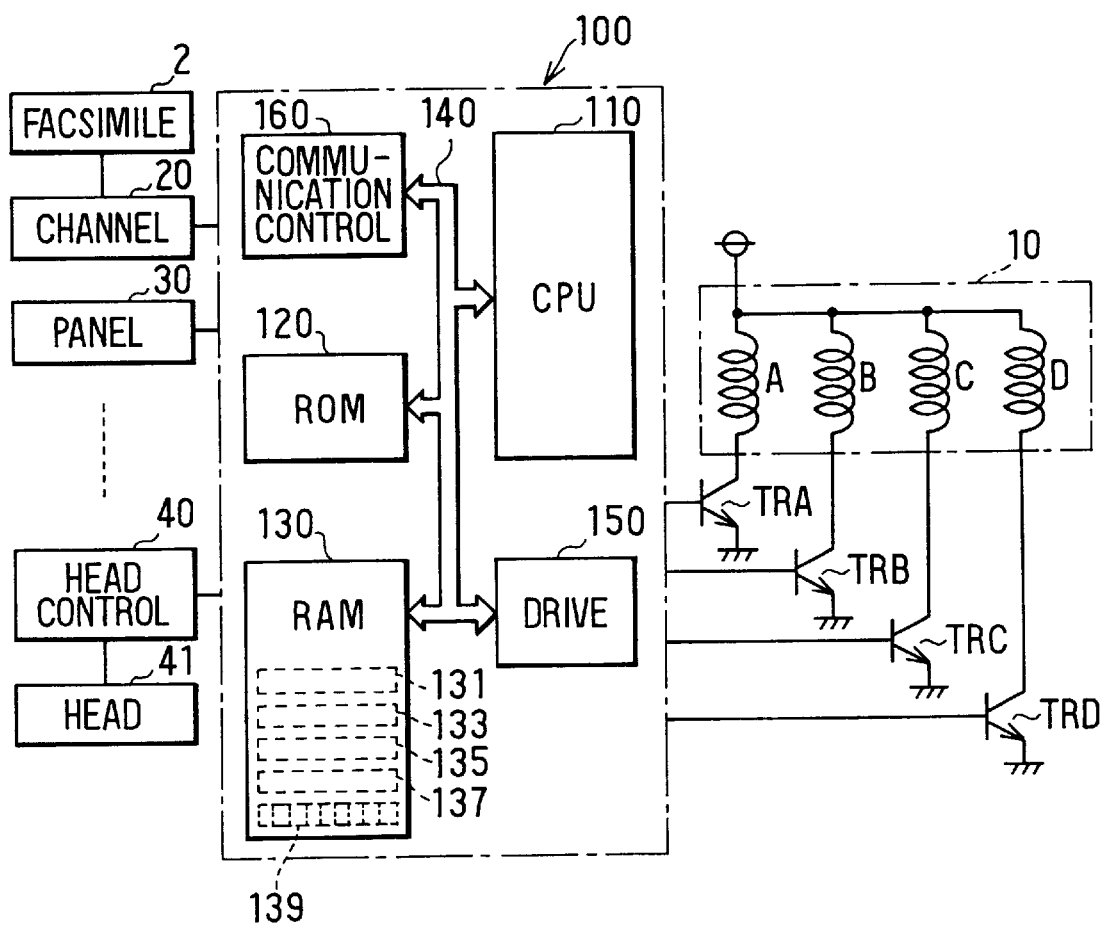
FIG. 1 is a block diagram schematically showing a facsimile apparatus according to an embodiment of the present invention.
Figures 5, 6:
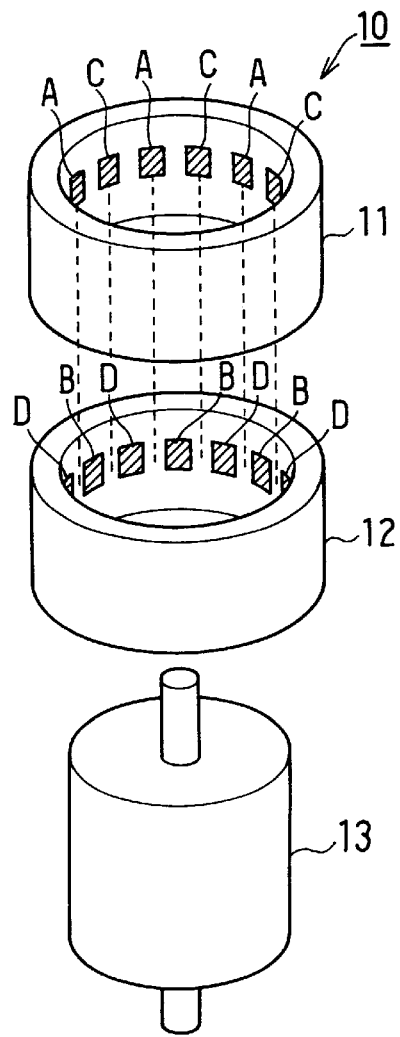
FIG. 5 is a table showing a line feed control pattern used in the related art and the embodiment shown in FIG. 1.
FIG. 6 is a schematic view of a stepping motor used in the related art and the embodiment shown in FIG. 1.

In a facsimile apparatus according to an embodiment of the present invention shown in FIG. 1, a line feed 4-phase stepping motor 10 which has the same construction as that shown in FIG. 6 is used. The facsimile apparatus has an electronic control apparatus 100 which is connected to a communication channel 20 connected to a similar facsimile apparatus 2 of the other party, an operation control panel 30, a recording head control apparatus 40 for controlling a recording head 41, and the like.

The control apparatus 100 includes a CPU (central processing unit) 110, a ROM (read-only memory), a RAM 130, a drive circuit 150 for driving the stepping motor 10 or the like, a communication control device 160 including a modem, etc. each of which is connected together via a bus 140. The CPU 110 produces control signals for controlling transistors TRA to TRD through the drive circuit 150 so that excitation of the respective phases from A-phase to D-phase of the stepping motor 10 is controlled.

The RAM 130 includes a reading buffer 131 for reading binary image data from an original document and storing therein the thus read binary image data, a transmission buffer 133 for temporarily storing encoded compressed data which is to be transmitted through the communication channel 20, a receiving buffer 135 for temporarily storing the compressed image data received through the communication channel 20, a recording buffer 137 for temporarily storing image data which results from decoding the received image data, a data area 139 in which the exciting state is stored in the form of a bit train, etc.

In the ROM 120, there are stored a control program by which the binary image data read out from the original document is converted into the encoded compressed image data, the encoded compressed image data is stored in the read buffer 131 and the compressed image data is transmitted; a control program by which the compressed image data temporarily stored in the receiving buffer 135 after having been received from the facsimile apparatus 2 through the communication channel 20 is decoded into image data, stored in the recording buffer 137 and the image data is outputted through the recording head 41 for a recording operation; and a line feed pattern in which the initial exciting phases to start the recording operation are set to fixed phases, A-B phases for instance.

Figures 2, 3:
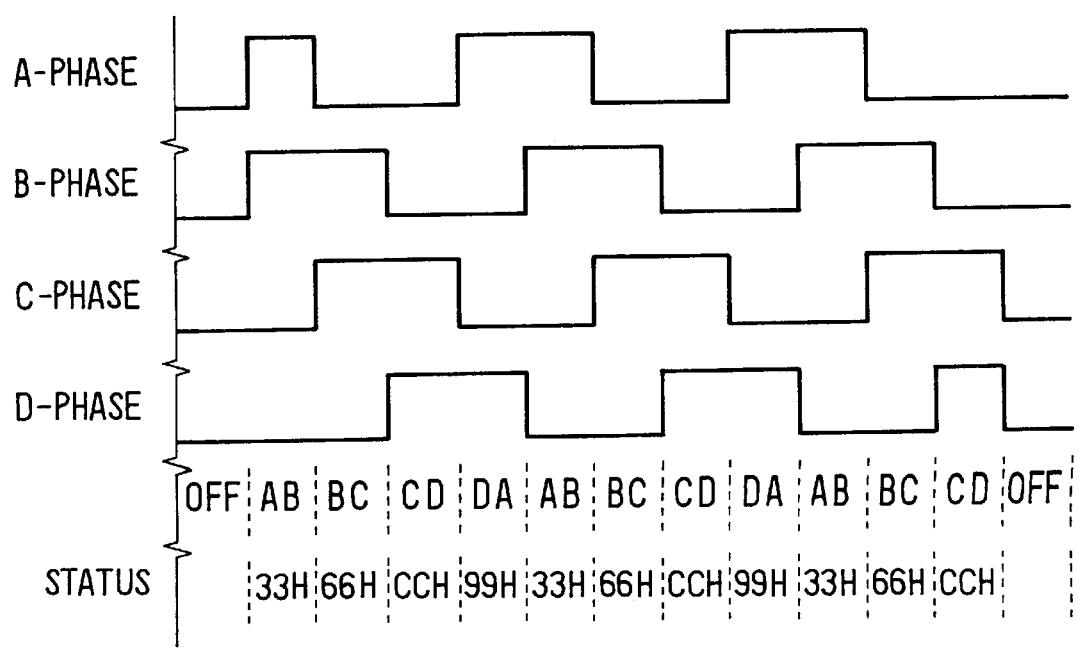
FIG. 2 is a table showing a stepping motor exciting control method according to the embodiment of in FIG. 1.
FIG. 3 is a timing chart showing the exciting state of the stepping motor according to the embodiment of FIG. 1.

In this embodiment, the stepping motor control, i.e., the phase exciting control is performed as shown in FIGS. 2 and 3.

That is, as shown in FIG. 2, in the data area 139 provided within the RAM 130 as the exciting phase memory, 8-bit exciting phase data indicative of the exciting state of the stepping motor 10 is successively rewritten by a bit train. The exciting phase expressed by the bit train is excited. Specifically, lower 4 bits are used to control the exciting state of the stepping motor 10. That is, the excitation states of A-, B-, C-, D-phases are controlled in the sequential order of the least significant bit. The exciting control is held at the high active state so that bit data "1" indicates the excitation state and bit data "0" indicates the non-excitation state.

Since the 4-phase stepping motor 10 used in this embodiment is based on the 2-phase exciting system, bit trains are expressed by four kinds of status, 33H, 66H, CCH, 99H.

A bit train for the A-B phases excitation is expressed as "00110011" (status 33H). Similarly, a bit train for the B-C phase excitation is expressed as "01100110" (status 66H), a bit train for the C-D phases excitation is expressed as "11001100" (status CCH), and a bit train for the DA-phase excitation is expressed as "100110001" (status 99H).

In the data area 139, the four kinds of bit trains are managed as four kinds of exciting phase counter MPC. For example, as is clear from FIG. 2, when the exciting phase counter MPC is "1", the lower four bits are "0011", which indicates the A-B phases excitation. Similarly, the excitation phase counter MPC has the counts, 2, 3 and 4 in the case of B-C phases excitation (66H), C-D phases excitation (CCH) and D-A phases excitation (99H), respectively.

The stepping motor 10 is driven by an excitation phase shifting, i.e., shifting in a stepwise fashion, as the excitation phase counter MPC changes its count from "1" to "4". That is, the stepping motor 10 is driven by shifting the bit trains to the higher bits in a stepwise fashion.

As shown in FIG. 3, the stepping motor 10 is excited at every 2 phases in a stepwise fashion according to the excitation states of the exciting phases. The rotor 13 of the stepping motor 10 is rotated in accordance with the shifting of the excitation phases.

Figure 4:
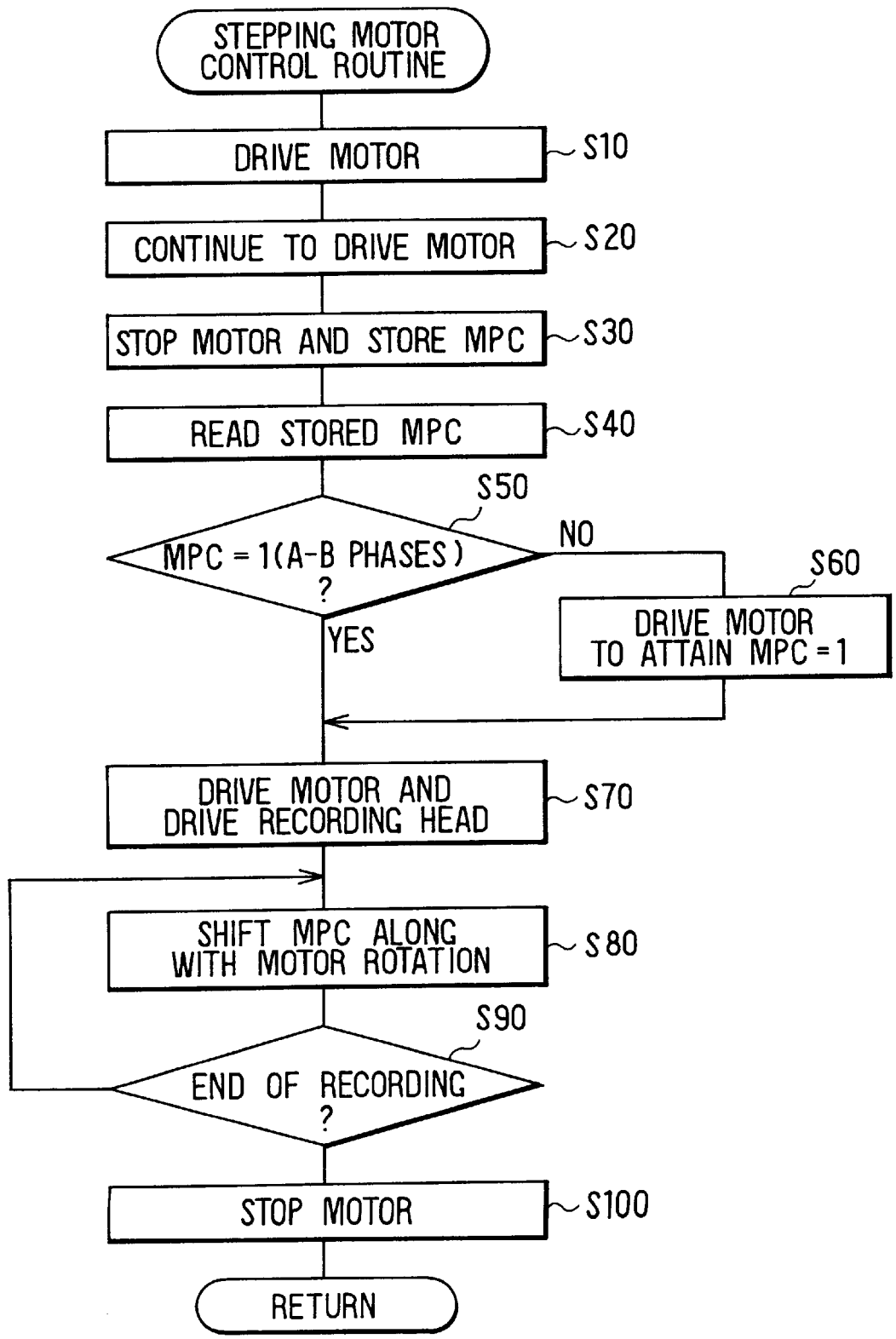
FIG. 4 is a flowchart for controlling the exciting phases of the stepping motor according to the embodiment of FIG. 1.

The recording operation according to this embodiment will hereinafter be described with reference to a flowchart shown in FIG. 4. The CPU 110 executes a stepping motor control routine shown in FIG. 4 when received data is to be recorded on a recording paper.

When the reception data from the facsimile apparatus 2 of the other party is received and placed in the recording mode, the stepping motor 10 is driven first by the excitation at step S10 and continued to be driven at step S20 so that the recording paper is advanced in a line feed fashion in order to provide a top margin of a predetermined amount from the top end. After the advancement of the recording paper, the stepping motor 10 is stopped or placed in the pause mode at step S30. At that time, excitation phase data indicative of the phases excited at that time point is stored in the data area 139, and the excitation phase counter MPC indicative of that excitation phase data is outputted to and memorized in the RAM 130.

Then, before starting recording operation of the image data on the recording paper, the excitation phase counter MPC is read out from the RAM 130 at step S40. In this embodiment, the excitation phases that are to be excited to start the recording operation on the recording paper are fixed to A-B phases. It is checked at step S50 whether or not the read out excitation phase counter MPC is "1".

If the excitation phase counter MPC is "1" (YES), then the stepping motor 10 is driven again to advance the recording paper in a line feed fashion at step S70, and at the same time, the recording is started by driving the recording head 41. If it is determined that the excitation phase counter MPC is not "1" (NO), then the stepping motor 10 is driven by additionally exciting the excitation phases forcedly, and the stepping motor 10 is rotated by predetermined steps (3 steps at maximum) at step S60 until the excitation phase counter MPC changes to "1". During this step S60, the recording head 41 is not driven. Then, at step S70, the normal recording is started by starting to drive the recording head 41 at the same time the recording paper is advanced in a line feed fashion from the position at which the excitation phase counter MPC is held at "1".

As the stepping motor 10 is driven, the excitation phase data is changed at step S80 in accordance with the predetermined line feed control pattern stored in the ROM 120, i.e., line feed control pattern provided when the excitation phases to start the recording are set to A-B phases until the stepping motor 10 is stopped at step S90. During this period, the stepping motor 10 is rotated in accordance with the change in the excitation phase data until it is determined at step S90 that the recording is to be ended. Then the stepping motor is stopped at step S100.

As described above, according to this embodiment, since the excitation phases excited to start the recording are fixed to one specific phase combination, there are not required a plurality of line feed control patterns. Therefore, the memory size can be reduced, and a recorded result becomes a uniform image because a recording density such as ink density on the recording paper is constant.

Further, when the image data is to be recorded on the recording paper with the top margin, the excitation state excited when the margin is formed is confirmed. If the excitation phases are not the A-B phases, then the recording by the recording head is started after the recording paper is advanced in a line feed fashion until the excitation phases become the A-B phases. Therefore, the recorded image becomes uniform with the constant recording density.

Furthermore, since the excitation state of the stepping motor 10 is managed by the bit train, the shift control of the excitation phases of the stepping motor 10 can be carried out with ease.

While the 4-phase stepping motor 10 is used in this embodiment, the present invention is not limited thereto, and it is also possible to use multi-phase stepping motor other than the 4-phase stepping motor. In addition, while the excitation state of the stepping motor 10 is successively stored in the data area 139 of the RAM 130 to update the excitation phase counter MPC, the present invention is not limited thereto. It is also possible to directly rewriting a data register of the CPU 110 thereby eliminating inputting to and outputting from the RAM 130 the excitation phase data.

Having described the preferred embodiment of the invention with reference to the accompanying drawings, it is to be understood that the invention is not limited to the disclosed embodiment but may be changed or modified by one skilled in the art without departing from the spirit or scope of the invention as defined in the appended claims.

What is claimed is:

1. A method of controlling a multi-phase stepping motor for advancing a recording paper set in an image forming apparatus, the method comprising the steps of:

determining a present exciting phase state of the stepping motor;

driving the stepping motor until the determined present exciting phase state coincides with a predetermined fixed exciting phase state; and starting image recording on the recording paper when the determined present exciting phase state is equal to the predetermined fixed exciting phase state.

2. An image forming apparatus including a multi-phase stepping motor for advancing a recording paper to record image information on the recording paper, the image forming apparatus comprising:

exciting phase memory means for continuously storing a present exciting state in exciting phases of the stepping motor;

drive control means for controlling a driving of the stepping motor in response to contents stored in the exciting phase memory means; and exciting phase shift means for shifting in a stepwise fashion the stepping motor to a predetermined fixed exciting phase memorized in the exciting phase memory means before an image recording is started, wherein the drive control means is for controlling the driving of the stepping motor based on a shift condition of exciting phase when the exciting phase is shifted by the exciting phase shift means.

3. The image forming apparatus according to claim 2, wherein:

the exciting phase memory means includes a data area for storing the present exciting state by a bit train or an identifier set in response to the bit train; and the exciting phase shift means is for checking an exciting state with reference to the bit train or identifier stored at that time point after the recording paper is advanced to a recording start position and shifting the bit train to a bit train indicative of the predetermined fixed exciting phase in stepwise.

* * * * *